United States Patent
Osaki et al.

(10) Patent No.: US 8,678,502 B2
(45) Date of Patent: Mar. 25, 2014

(54) HEADREST POSITION ADJUSTMENT DEVICE

(75) Inventors: Takuya Osaki, Sakura (JP); Yuichiro Yamaguchi, Sakura (JP); Yuki Noguchi, Sakura (JP); Koji Sakiyama, Sakura (JP)

(73) Assignee: Fujikura Ltd., Tokyo (JP)

( * ) Notice: Subject to any disclaimer, the term of this patent is extended or adjusted under 35 U.S.C. 154(b) by 80 days.

(21) Appl. No.: 13/502,559

(22) PCT Filed: Oct. 18, 2010

(86) PCT No.: PCT/JP2010/068283
§ 371 (c)(1),
(2), (4) Date: Jul. 2, 2012

(87) PCT Pub. No.: WO2011/049048
PCT Pub. Date: Apr. 28, 2011

(65) Prior Publication Data
US 2012/0261969 A1    Oct. 18, 2012

(30) Foreign Application Priority Data
Oct. 19, 2009 (JP) .................. 2009-240093

(51) Int. Cl.
*A47C 7/36* (2006.01)
(52) U.S. Cl.
USPC ............. 297/391; 297/410; 297/216.12
(58) Field of Classification Search
USPC ................... 297/410, 391, 216.12
See application file for complete search history.

(56) References Cited

U.S. PATENT DOCUMENTS

| | | | | |
|---|---|---|---|---|
| 6,402,195 | B1* | 6/2002 | Eisenmann et al. | 280/735 |
| 7,794,012 | B2* | 9/2010 | Szablewski | 297/216.12 |
| 8,201,883 | B2* | 6/2012 | Wuerstlein et al. | 297/216.12 |
| 2007/0267909 | A1* | 11/2007 | Truckenbrodt et al. | 297/410 |
| 2008/0252303 | A1* | 10/2008 | Kato et al. | 324/661 |
| 2009/0069985 | A1* | 3/2009 | Sakai et al. | 701/49 |
| 2009/0096468 | A1 | 4/2009 | Hirota et al. | |
| 2010/0140992 | A1 | 6/2010 | Yamaguchi | |
| 2011/0254572 | A1* | 10/2011 | Yamaguchi et al. | 324/688 |

FOREIGN PATENT DOCUMENTS

| | | |
|---|---|---|
| JP | 64-11512 A | 1/1989 |
| JP | 2007-137219 A | 6/2007 |
| JP | 2008-265644 A | 11/2008 |

OTHER PUBLICATIONS

International Search Report of PCT/JP2010/068283, mailing date Nov. 9, 2010.

* cited by examiner

*Primary Examiner* — Sarah B McPartlin
(74) *Attorney, Agent, or Firm* — Westerman, Hattori, Daniels & Adrian, LLP

(57) ABSTRACT

A headrest position adjustment device includes a capacitance sensor unit, and a drive motor unit. The capacitance sensor unit includes a plurality of electrode groups each configured by a plurality of sensing electrodes. The total electrode area of each of the electrode groups is switchable by a switching unit of a circuit unit between at least a total electrode area A and a total electrode area A+B. The total electrode area A is selected when the distance d between a head and a headrest is short, and the total electrode area A+B is selected when the distance is long. In this way, the sensitivity is changed depending on how long or how short the distance is. An estimated center position of the head is calculated based on capacitance values obtained, and thereby the position of the headrest is adjusted.

16 Claims, 9 Drawing Sheets

When Head-Sensor Distance d is Short

When Head-Sensor Distance d is Long

HEADREST POSITION ADJUSTMENT DEVICE

TECHNICAL FIELD

The present invention relates to a headrest position adjustment device which adjusts the position of a headrest provided so as to correspond to a seat of a vehicle such as an automobile, etc.

BACKGROUND ART

A headrest position adjustment device (for example, see Patent Document 1 (pp. 6-8, FIG. 1 to FIG. 6)) is known as a technique for adjusting the position of a headrest provided so as to correspond to a seat of a vehicle such as an automobile, etc. This headrest position adjustment device includes a capacitance sensor unit and a drive motor unit. The capacitance sensor unit includes a plurality of sensing electrodes and a detecting circuit.

The detecting circuit calculates an estimated center position of a head in the height direction based on sensing signals from the respective sensing electrodes, so that the position of the headrest with respect to the seat is adjusted based on the estimated center position.

CONVENTIONAL ART DOCUMENT

Patent Document

Patent Document 1: Unexamined Japanese Patent Application Publication No. 2008-265644

DISCLOSURE OF INVENTION

Problem to be Solved by the Invention

However, in the headrest position adjustment device disclosed in Patent Document 1 identified above, the area, etc. of the sensing electrodes constituting the capacitance sensor unit are constant, and hence the sensitivity of the capacitance sensor unit is fixed. Therefore, there is a problem that when the head and the headrest are too close and hence the sensor outputs are saturated, an estimated center position cannot be identified.

Furthermore, when the head and the headrest are far, the respective sensing electrodes tend to have no significant difference between their capacitance value outputs. Hence, there is likewise a problem that an estimated center position cannot be identified and the position of the headrest cannot be adjusted appropriately.

To overcome the problems of the conventional technique described above, an object of the present invention is to provide a headrest position adjustment device which can adjust the position of a headrest accurately regardless of how far or how close the head and the headrest are.

Means for Solving the Problem

To solve the problems described above and achieve the object, a first headrest position adjustment device according to the present invention includes: an electrode group provided in a headrest mounted on a vehicle so as to correspond to a seat, the electrode group including a plurality of sensing electrodes for sensing capacitances between a head of a human body sitting on the seat and the headrest; switching device which switches electric connection of the sensing electrodes of the electrode group to change a total active electrode area of the electrode group; detecting device which detects capacitance values in accordance with outputs from all active electrodes of the electrode group; and position adjusting device which adjusts a position of the headrest in a height direction based on the capacitance values from the detecting device, wherein the switching device makes the total active electrode area of the electrode group smaller when the capacitance values detected by the detecting device are larger than a threshold.

A second headrest position adjustment device according to the present invention includes: an electrode group provided in a headrest mounted on a vehicle so as to correspond to a seat, the electrode group including a plurality of sensing electrodes for sensing capacitances between a head of a human body sitting on the seat and the headrest; switching device which switches electric connection of the sensing electrodes of the electrode group to change a total active electrode area of the electrode group; detecting device which detects capacitance values in accordance with outputs from all active electrodes of the electrode group; and position adjusting device which adjusts a position of the headrest in a height direction based on the capacitance values from the detecting device, wherein the detecting device detects at least two capacitance values at positions different in the height direction, and the switching device makes the total active electrode area of the electrode group smaller when a difference between a largest capacitance value and any other capacitance value of the capacitance values detected by the detecting device is smaller than a threshold.

A third headrest position adjustment device according to the present invention includes: an electrode group provided in a headrest mounted on a vehicle so as to correspond to a seat, the electrode group including a plurality of sensing electrodes for sensing capacitances between a head of a human body sitting on the seat and the headrest; switching device which switches electric connection of the sensing electrodes of the electrode group to change a total active electrode area of the electrode group; detecting device which detects capacitance values in accordance with outputs from all active electrodes of the electrode group; and position adjusting means which adjusts a position of the headrest in a height direction based on the capacitance values from the detecting device, wherein the switching device makes the total active electrode area of the electrode group larger when the capacitance values detected by the detecting device are smaller than a threshold.

A fourth headrest position adjustment device according to the present invention includes: an electrode group provided in a headrest mounted on a vehicle so as to correspond to a seat, the electrode group including a plurality of sensing electrodes for sensing capacitances between a head of a human body sitting on the seat and the headrest; switching device which switches electric connection of the sensing electrodes of the electrode group to change a total active electrode area of the electrode group; detecting device which detects capacitance values in accordance with outputs from all active electrodes of the electrode group; and position adjusting device which adjusts a position of the headrest in a height direction based on the capacitance values from the detecting device, wherein the detecting device detects at least two capacitance values at positions different in the height direction, and the switching device makes the total active electrode area of the electrode group larger when a difference between a largest capacitance value and any other capacitance value of the capacitance values detected by the detecting device is smaller than a threshold.

A fifth headrest position adjustment device according to the present invention includes: an electrode group provided in a headrest mounted on a vehicle so as to correspond to a seat, the electrode group including a plurality of sensing electrodes for sensing capacitances between a head of a human body sitting on the seat and the headrest; switching device which switches electric connection of the sensing electrodes of the electrode group to change a total active electrode area of the electrode group; detecting device which detects capacitance values in accordance with outputs from all active electrodes of the electrode group; and position adjusting device which adjusts a position of the headrest in a height direction based on the capacitance values from the detecting device, wherein the detecting device detects at least two capacitance values at positions different in the height direction, and the switching device compares a difference, of a case when the total active electrode area of the electrode group is larger, between a largest capacitance value and any other capacitance value of the capacitance values detected by the detecting device with a difference, of a case when the total active electrode area of the electrode group is smaller, between a largest capacitance value and any other capacitance value of the capacitance values detected by the detecting device, and selects an active electrode or active electrodes so as to secure the total active electrode area of the case with a larger one of the differences.

It is preferable that the first and second headrest position adjustment devices described above start the process in the state that the total active electrode area of the electrode group is larger, and the third and fourth headrest position adjustment devices described above start the process in the state that the total active electrode area of the electrode group is smaller.

When only one electrode group is provided in the headrest, the second, fourth, and fifth headrest position adjustment devices described above may perform a scanning operation by moving the headrest in the height direction in order to let the detecting device detect at least two capacitance values at positions different in this height direction.

Further, in the first to fifth headrest position adjustment devices described above, it is preferable that the position adjusting device calculate an estimated center position of the head in the height direction based on the capacitance values detected by the detecting device, and perform a position adjustment operation in such a way as to adjust the position of the headrest to be matched with the calculated estimated center position.

For example, the difference is a difference between a largest measurement value and a smallest measurement value of the capacitance values.

For example, a plurality of electrode groups are provided side by side along the height direction of the headrest.

Effect of the Invention

According to the present invention, it is possible to provide a headrest position adjustment device which can adjust the position of a headrest accurately regardless of how far or how close the head and the headrest are.

BEST MODE FOR CARRYING OUT THE INVENTION

A preferred embodiment of a headrest position adjustment device according to the present invention will be explained in detail below with reference to the attached drawings.

Figure 1:
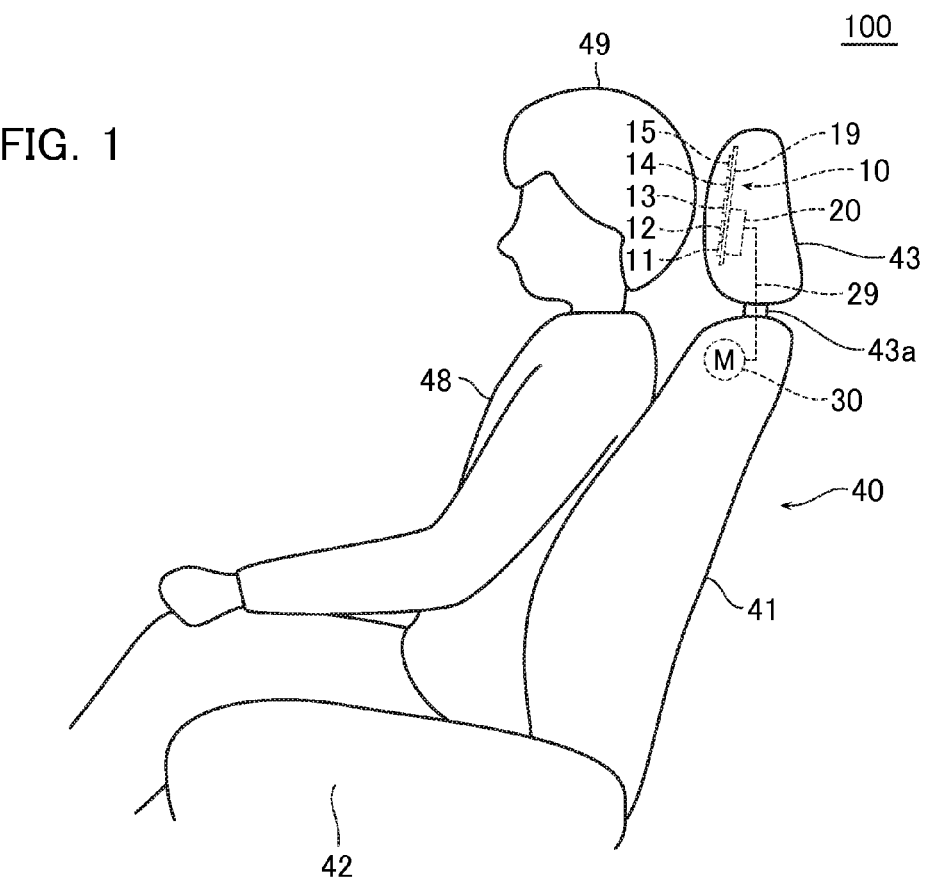
FIG. 1 is an explanatory diagram showing an example of a seat of a vehicle mounted with a headrest position adjustment device according to one embodiment of the present invention.
Figure 2:
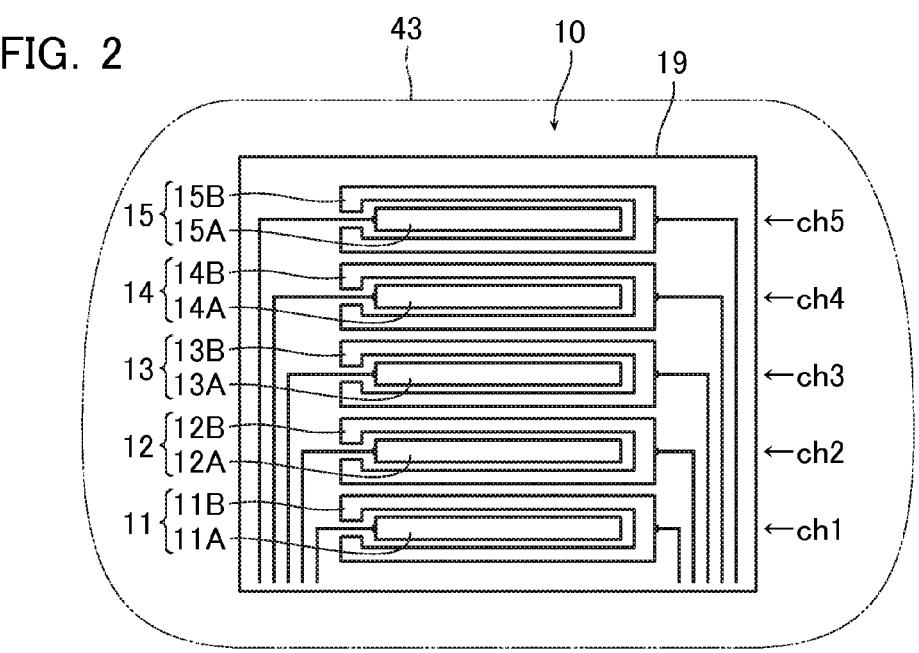
FIG. 2 is an explanatory diagram showing an example of how electrode groups of the headrest position adjustment device are arranged in a headrest.
Figure 3:
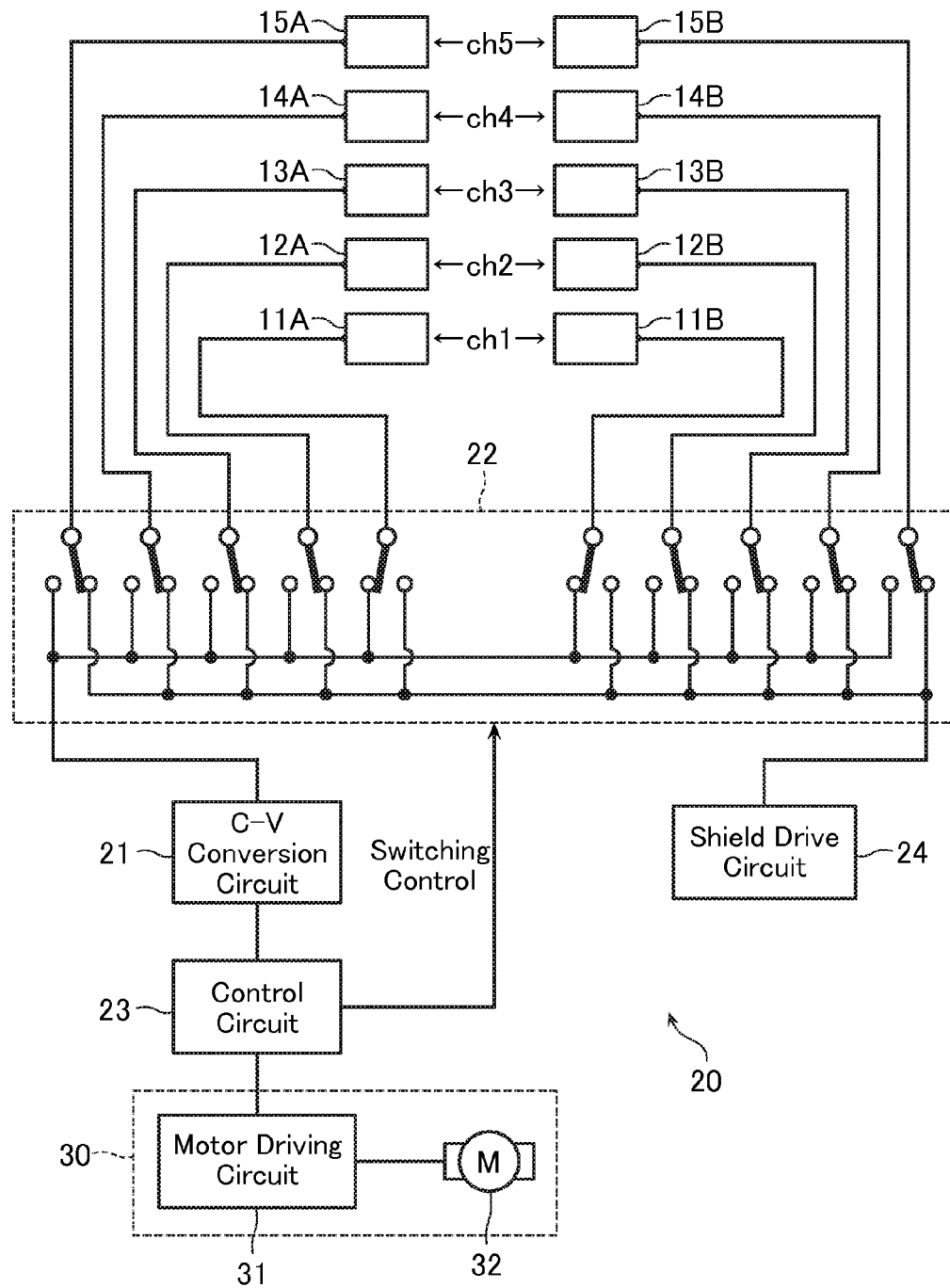
FIG. 3 is a block diagram showing an example of the whole configuration of the headrest position adjustment device.

FIG. 1 is an explanatory diagram showing an example of a seat of a vehicle mounted with a headrest position adjustment device according to one embodiment of the present invention. FIG. 2 is an explanatory diagram showing an example of how electrode groups of the headrest position adjustment device are arranged in a headrest. FIG. 3 is a block diagram showing an example of the whole configuration of the headrest position adjustment device.

As shown in FIG. 1 and FIG. 2, the headrest position adjustment device 100 is provided on a seat 40 of a vehicle, etc., and includes: a capacitance sensor unit 10 provided in, for example a front portion of a headrest 43 of the seat 40; and a drive motor unit 30 provided in a backrest (back seat) 41 of the seat 40. The capacitance sensor unit 10 and the drive motor unit 30 are electrically connected through, for example, a harness 29.

For example, the headrest 43 is connected to the backrest 41 of the seat 40 so as to be freely movable with respect to the backrest 41 in the up-down direction of the vehicle (the height direction of the headrest 43) through a support shaft 43a. Other than this, the headrest 43 may be configured to be freely movable in the front-rear direction of the vehicle, and the drive motor unit 30 may be provided in the headrest 43. The headrest 43 may also be provided on the ceiling of the vehicle so as to correspond to the seat 40.

For example, the capacitance sensor unit 10 includes: a plurality of electrode groups 11 to 15 formed on one surface (front surface) of a substrate 19; and a circuit unit 20 formed (mounted) on the other surface (rear surface) of the substrate 19. The capacitance sensor unit 10 detects capacitance values that are based on capacitances from the respective electrode groups 11 to 15, calculates a position (an estimated center position) estimated to be the height-direction center of a head 49 of a human body 48 sitting on a sitting portion 42 of the seat 40 based on the capacitance values, and outputs a calculation result that makes the headrest 43 be adjusted at least in the up-down direction to be matched with the estimated center position.

The substrate 19 is made of, for example, a flexible printed board (FPC), a rigid substrate, or a rigid flex substrate. The electrode groups 11 to 15 are made of a conductive material such as copper, a copper alloy, aluminum, etc. patterned on the substrate 19 made of an insulating material such as polyethylene terephthalate (PET), polyethylene naphthalate (PEN), polyimide (PI), polyamide (PA), a glass epoxy resin, etc.

Other than this, the electrode groups 11 to 15 may be made of materials such as a wire, a conductive film, etc., or may be made of a transparent electrode. In this case, the substrate 19 may be made of a panel or film having transparency, and the electrode groups 11 to 15 may be made of a transparent electrode. A transparent electrode that can be used may be made of, for example, PEDOT/PSS (polyethylene dioxythiophene/polystyrene sulfonic acid), PEDOT/TsO (polyethylene dioxythiophene/toluene sulfonate).

For example, the electrode groups 11 to 15 are arranged side by side along the height direction of the headrest 43, assigned electrode numbers (ch1 to ch5) respectively, and each configured by a plurality of sensing electrodes. Namely, the electrode group 11 is configured by a sensing electrode 11A and a sensing electrode 11B, and the electrode group 12 is configured by a sensing electrode 12A and a sensing electrode 12B.

The electrode group 13 is configured by a sensing electrode 13A and a sensing electrode 13B, and the electrode group 14 is configured by a sensing electrode 14A and a sensing electrode 14B. Furthermore, the electrode group 15 is configured by a sensing electrode 15A and a sensing electrode 15B. The sensing electrodes 11A to 15A of the electrode groups 11 to 15 constitute sensors A respectively, and, for example, are formed in a rectangular strip shape having its longer dimension extend in a width direction (a left-right direction) perpendicular to the height direction of the headrest 43. The sensing electrodes 11A to 15A are arranged side by side such that their widths are lined up along the height direction of the headrest 43.

On the other hand, the sensing electrodes 11B to 15B of the electrode groups 11 to 15 constitute sensors B respectively, are formed in a hollow rectangular shape surrounding the outer circumference of the sensing electrodes 11A to 15A respectively (the shape being partially cut away for wiring), and are arranged side by side in the same condition as described above. In the present example, the electrode area of the respective sensing electrodes 11A to 15A is smaller than the electrode area of the respective sensing electrodes 11B to 15B. That is, the area of the sensor A<the area of the sensor B. The sensing electrodes 11A to 15A and 11B to 15B are disposed on the same plane in an insulated state.

Hence, the headrest position adjustment device 100 is configured to be capable of changing a total electrode area representing an active electrode area of the respective electrode groups 11 to 15 among A, B, and A+B, from when making only the sensor A active, when making only the sensor B active, and when making sensors A+B active.

As shown in FIG. 3, the circuit unit 20 is connected to the capacitance sensor unit 10, and, for example, includes: a C-V conversion circuit 21 connected to the electrode groups 11 to 15 through a switching unit 22; a control circuit 23 configured to perform various calculations and controls based on outputs from the C-V conversion circuit 21; and a shield drive circuit 24 connected to the electrode groups 11 to 15 through the switching unit 22 and configured to drive a predetermined sensing electrode to an electric potential equal or similar to an active sensing electrode in order to operate the predetermined sensing electrode as a shield.

The C-V conversion circuit 21 converts capacitances sensed by the sensing electrodes 11A to 15A, or the sensing electrodes 11B to 15B, or the sensing electrodes 11A to 15A+11B to 15B of the respective electrode groups 11 to 15 to voltages, generates, for example, pulse signals of which duty ratios change according to the capacitances with respect to the head 49, smoothes the pulse signals, and outputs them as sensing signals (measured values). The C-V conversion circuit 21 can be configured by using, for example, a publicly-known timer IC.

The control circuit 23 includes, for example, a CPU, a RAM, a ROM, etc., calculates an estimated center position of the head 49 by performing function approximation using, for example, a function of third or higher order based on capacitance values which are based on the measured values from the C-V conversion circuit 21 that are based on the capacitances sensed by the electrode groups 11 to 15, and outputs a control signal representing calculation result information based on the calculation result to the drive motor unit 30 configured to change the position of the headrest 43 in at least the up-down direction.

The control circuit 23 controls the switching unit 22 based on the capacitance values in order to change the total electrode area of active sensing electrode(s) of the respective electrode groups 11 to 15 described above among A, B, and A+B. If it is unnecessary to operate sensing electrodes other than active sensing electrodes as a shield, the shield drive circuit 24 needs not be provided.

The drive motor unit 30 includes a motor driving circuit 31 configured to change the position of the headrest 43 by controlling a drive motor 32 based on a control signal from the control circuit 23. The drive motor unit 30 also includes a drive motor 32 configured to move the headrest 43 actually under the control of the motor driving circuit 31.

It is only necessary that at least one of the electrode groups 11 to 15 be provided in the headrest 43. Three or more sensing electrodes may be provided to configure an electrode group. The sensing electrodes 11A to 15A and 11B to 15B may be formed such that the area A and the area B are the same. When only one electrode group is provided, a capacitance scanning operation is performed in advance by moving the headrest 43 in the height direction in order to detect at least two capacitance values from positions different in the height direction.

Figure 4:
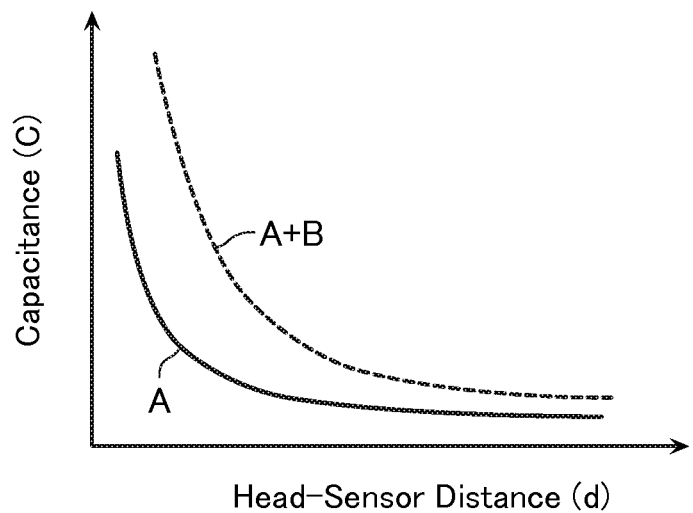
FIG. 4 is an explanatory diagram for explaining capacitance vs. head-sensor distance characteristics (distance characteristics) of the headrest position adjustment device, for each total electrode area of the electrode groups.
Figure 5:
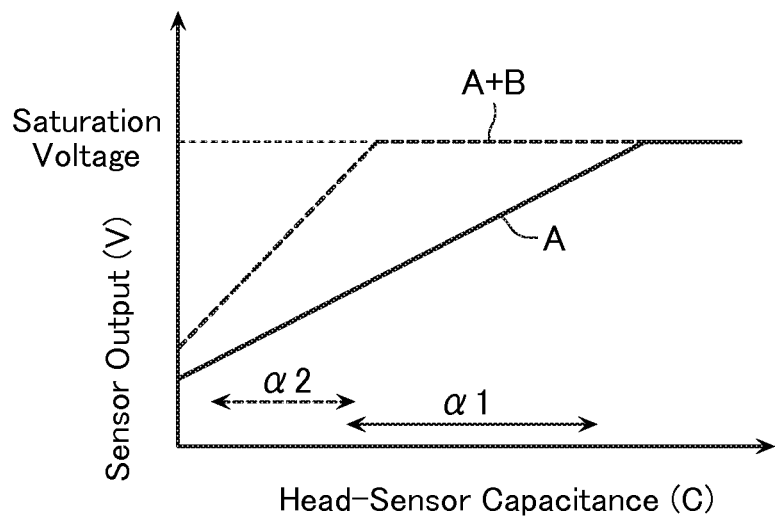
FIG. 5 is an explanatory diagram for explaining sensor output vs. head-sensor capacitance characteristics (C-V conversion characteristics) of the headrest position adjustment device.

FIG. 4 is an explanatory diagram for explaining capacitance vs. head-sensor distance characteristics (distance characteristics) of the headrest position adjustment device, for each total electrode area of the electrode groups. FIG. 5 is an explanatory diagram for explaining sensor output vs. head-sensor capacitance characteristics (C-V conversion characteristics) of the headrest position adjustment device. Here, for explanatory convenience, explanation is given on two cases, namely, a case when the total electrode area is A and a case when the total electrode area is A+B.

When a measurement target (for example, the head 49) has a predetermined size or larger with respect to the electrode groups 11 to 15, as the total electrode area of each of the electrode groups 11 to 15 is larger, the capacitance C to be sensed is larger at the same head-sensor distance d, as shown in FIG. 4. Specifically, the capacitance C has a relationship of $C=\epsilon(S/d)$ with respect to the head-sensor distance d and the area S of the electrode groups 11 to 15. That is, the curve of the total electrode area A+B has a better distance characteristic than the curve of the total electrode area A.

On the other hand, a voltage to be output as a sensor output V from the C-V conversion circuit 21 is normally proportional to the capacitance C sensed, but becomes saturated when it reaches a predetermined value or higher, as shown in FIG. 5. That is, if an optimum capacitance range α1 of capacitances to be detected when the total electrode area is A and an optimum capacitance range α2 of capacitances to be detected when the total electrode area is A+B are switched in accordance with the head-sensor distance d, it becomes possible to perform detection of the head 49 within the largest possible dynamic range within which no output voltage saturation will occur.

Hence, the headrest position adjustment device 100 configured as described above switches the total electrode areas in accordance with the head-sensor distance d, calculates an estimated center position of, for example, the head 49 based on the obtained capacitance values by approximation using a function of third or higher order, and adjusts the position of the headrest 43. Specifically, measurement data are as shown in Table 1 below.

TABLE 1

| Sensor No. | Initial capacitance (C-V converted value) | | Sensor output (absolute value) | | Sensor output (difference) | |
|---|---|---|---|---|---|---|
| | $V0_A$ | $V0_{AB}$ | $V1_A$ | $V1_{AB}$ | $\Delta V_A = V1_a - V0_a$ | $\Delta V_{AB} = V1_{AB} - V0_{AB}$ |
| ch5 | $V0_A(5)$ | $V0_{AB}(5)$ | $V1_A(5)$ | $V1_{AB}(5)$ | $\Delta V_A(5)$ | $\Delta V_{AB}(5)$ |
| ch4 | $V0_A(4)$ | $V0_{AB}(4)$ | $V1_A(4)$ | $V1_{AB}(4)$ | $\Delta V_A(4)$ | $\Delta V_{AB}(4)$ |
| ch3 | $V0_A(3)$ | $V0_{AB}(3)$ | $V1_A(3)$ | $V1_{AB}(3)$ | $\Delta V_A(3)$ | $\Delta V_{AB}(3)$ |
| ch2 | $V0_A(2)$ | $V0_{AB}(2)$ | $V1_A(2)$ | $V1_{AB}(2)$ | $\Delta V_A(2)$ | $\Delta V_{AB}(2)$ |
| ch1 | $V0_A(1)$ | $V0_{AB}(1)$ | $V1_A(1)$ | $V1_{AB}(1)$ | $\Delta V_A(1)$ | $\Delta V_{AB}(1)$ |
| Total electrode area | A | A + B | A | A + B | A | A + B |

As shown in Table 1, when initial capacitance (C-V converted value) found when the head 49 is not detected is defined as $V0_A$ when the total electrode area of each of the electrode groups 11 to 15 is A and as $V0_{AB}$ when the total electrode area is A+B, initial capacitances corresponding to the sensors Nos. ch1 to ch5 are $V0_A(1)$ to $V0_A(5)$ and $V0_{AB}(1)$ to $V0_{AB}(5)$, respectively.

Further, when sensor output (absolute value) found when the head 49 is detected is defined as $V1_A$ when the total electrode area of each of the electrode groups 11 to 15 is A and as $V1_{AB}$ when the total electrode area is A+B, sensor outputs corresponding to the sensors Nos. ch1 to ch5 are $V1_A(1)$ to $V1_A(5)$ and $V1_{AB}(1)$ to $V1_{AB}(5)$, respectively.

Furthermore, when sensor output (difference) obtained by subtracting initial capacitance (C-V converted value) from sensor output (absolute value) is defined as $\Delta V_A (=V1_A-V0_A)$ when the total electrode area of each of the electrode groups 11 to 15 is A and as $\Delta V_{AB}=(V1_{AB}-V0_{AB})$ when the total electrode area is A+B, sensor outputs corresponding to the sensors Nos. ch1 to ch5 are $\Delta V_A(1)$ to $\Delta V_A(5)$ and $\Delta V_{AB}(1)$ to $\Delta V_{AB}(5)$, respectively.

Figure 6A:
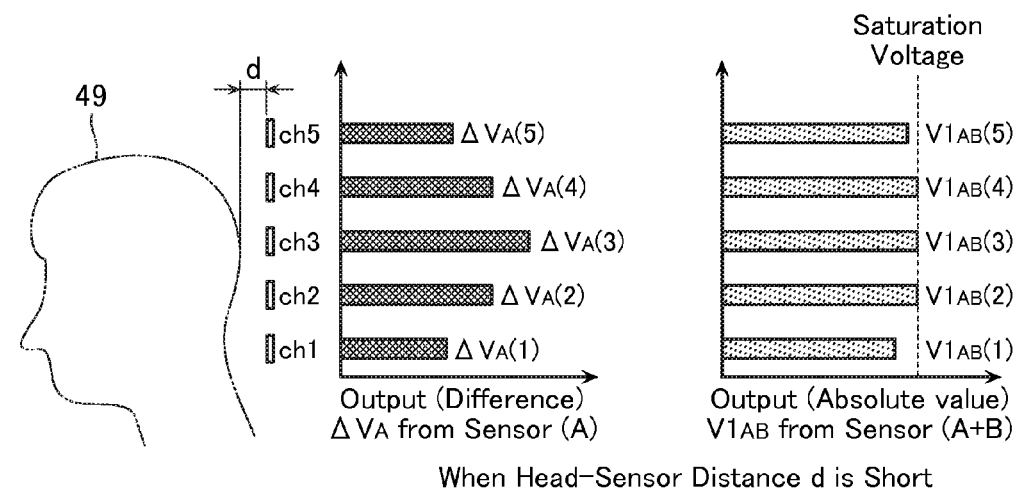
FIG. 6A is an explanatory diagram for explaining sensor outputs of the headrest position adjustment device subject to differences of the sensor-head distance.
Figure 6B:
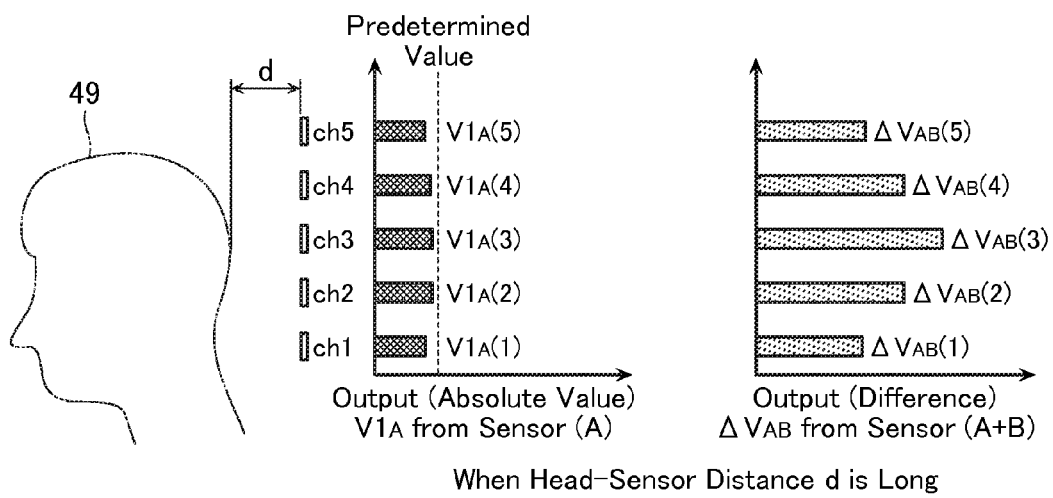
FIG. 6B is an explanatory diagram for explaining sensor outputs of the headrest position adjustment device subject to differences of the sensor-head distance.

FIGS. 6A and 6B are explanatory diagrams for explaining sensor outputs of the headrest position adjustment device 100 subject to differences of the sensor-head distance. When, for example, the head-sensor distance d is short and the total electrode area of each of the electrode groups 11 to 15 is larger than the total electrode area A, i.e., here, when the total electrode area is A+B as shown in FIG. 6A, the headrest position adjustment device 100 judges whether or not the sensor outputs (absolute values) detected are larger than a predetermined value (here, a saturation voltage).

In the example shown, at least the sensor outputs (absolute values) $V1_{AB}(2)$ to (4) are larger than the saturation voltage (the larger part of the outputs not shown). Hence, the control circuit 23 controls the switching unit 22 to switch the total electrode area A+B of each of the electrode groups 11 to 15 to the total electrode area A, in order to perform position adjustment of the headrest 43 by using sensor outputs (differences) $\Delta V_A(1)$ to (5) to be obtained after the sensitivity is changed (suppressed).

In this case, function approximation described above is performed by using the sensor outputs (differences), and the position of, for example, ch3 (the sensing electrode 13A of the electrode group 13) that has measured the largest measurement value $\Delta V_A(3)$ is judged as the estimated center position of the head 49. Then, for example, a control signal for actuating the drive motor 32 to match the height-direction center position of the headrest 43 with this estimated center position is output to the drive motor unit 30, and the position of the headrest 43 is adjusted.

Other than this, the operation may be as follows, when the total electrode area is A+B. Specifically, it is judged whether or not the difference $(=V1_{AB}(3)-V1_{AB}(1))$ between the largest measurement value (here, assumed to be $V1_{AB}(3)$) and smallest measurement value (here, assumed to be $V1_{AB}(1)$) among the sensor outputs (absolute values) is smaller than a predetermined value.

Then, when the difference is smaller than the predetermined value, the total electrode area A+B of each of the electrode groups 11 to 15 is switched to the total electrode area A, so that position adjustment of the headrest 43 is performed likewise after the sensitivity is changed. Also in this way, it is possible to perform position adjustment of the headrest 43, even when the head-sensor distance d is short like as described above. Note that another measurement value (here, $V1_{AB}(5)$) may be used instead of the smallest measurement value.

On the other hand, when, for example, the head-sensor distance d is long and the total electrode area of each of the electrode groups 11 to 15 is smaller than the total electrode area A+B, i.e., here, when the total electrode area is A as shown in FIG. 6B, the headrest position adjustment device 100 judges whether or not the sensor outputs (absolute values) detected are smaller than a predetermined value (here, a predetermined threshold).

In the example shown, all of the sensor outputs (absolute values) $V1_A(1)$ to (5) are smaller than the predetermined value. Hence, the control circuit 23 controls the switching unit 22 to switch the total electrode area A of each of the electrode groups 11 to 15 to the total electrode area A+B, in order to perform position adjustment of the headrest 43 by using sensor outputs (differences) $\Delta V_{AB}(1)$ to (5) to be obtained after the sensitivity is changed (improved).

In this case, function approximation described above is performed by using the sensor outputs (differences), and the position of, for example, ch3 (the sensing electrodes 13A and 13B of the electrode group 13) that has measured the largest measurement value $\Delta V_{AB}(3)$ is judged as the estimated center position of the head 49. Then, for example, a control signal for actuating the drive motor 32 to match the height-direction center position of the headrest 43 with this estimated center position is output to the drive motor unit 30, and the position of the headrest 43 is adjusted.

Other than this, the operation may be as follows, when the total electrode area is A. Specifically, it is judged whether or not the difference $(=V1_A(3)-V1_A(1))$ between the largest measurement value (here, assumed to be $V1_A(3)$) and the smallest measurement value (here, assumed to be $V1_A(1)$) among the sensor outputs (absolute values) is smaller than a predetermined value.

Then, when the difference is smaller than the predetermined value, the total electrode area A of each of the electrode groups 11 to 15 is switched to the total electrode area A+B, so that position adjustment of the headrest 43 is performed likewise after the sensitivity is changed. Also in this way, it is possible to perform position adjustment of the headrest 43, even when the head-sensor distance d is long like as described above. Another measurement value described above may be the smallest measurement value (here, $V1_A(5)$).

In this way, the headrest position adjustment device 100 can adjust the position of the headrest 43 accurately by calculating an estimated center position of the head 49 without fault by adjusting the sensitivity to the optimum condition regardless of how long or how short the distance d between the head 49 and the headrest 43 is. The sensitivity may be changed by switching the total electrode area of each of the electrode groups 11 to 15 in a few steps as in A<B<A+B, or by switching the total electrode area more precisely based on combinations, etc. of sensing electrodes when there are three or more sensing electrodes.

The headrest position adjustment device 100 may not only adjust the up-down direction position of the headrest 43 in accordance with the obtained estimated center position of the head 49, but also adjust the front-rear direction position of the headrest 43 by using the sensor outputs. In this case, for example, shape profile data representing the shape of the head 49 or the like may be calculated by using the sensor outputs, so that the drive motor unit 30 can drive the headrest 43 in the front-rear direction so as to match this shape profile data with a preset shape profile that is acquired when the head-sensor distance d is an optimum distance.

Figure 7:
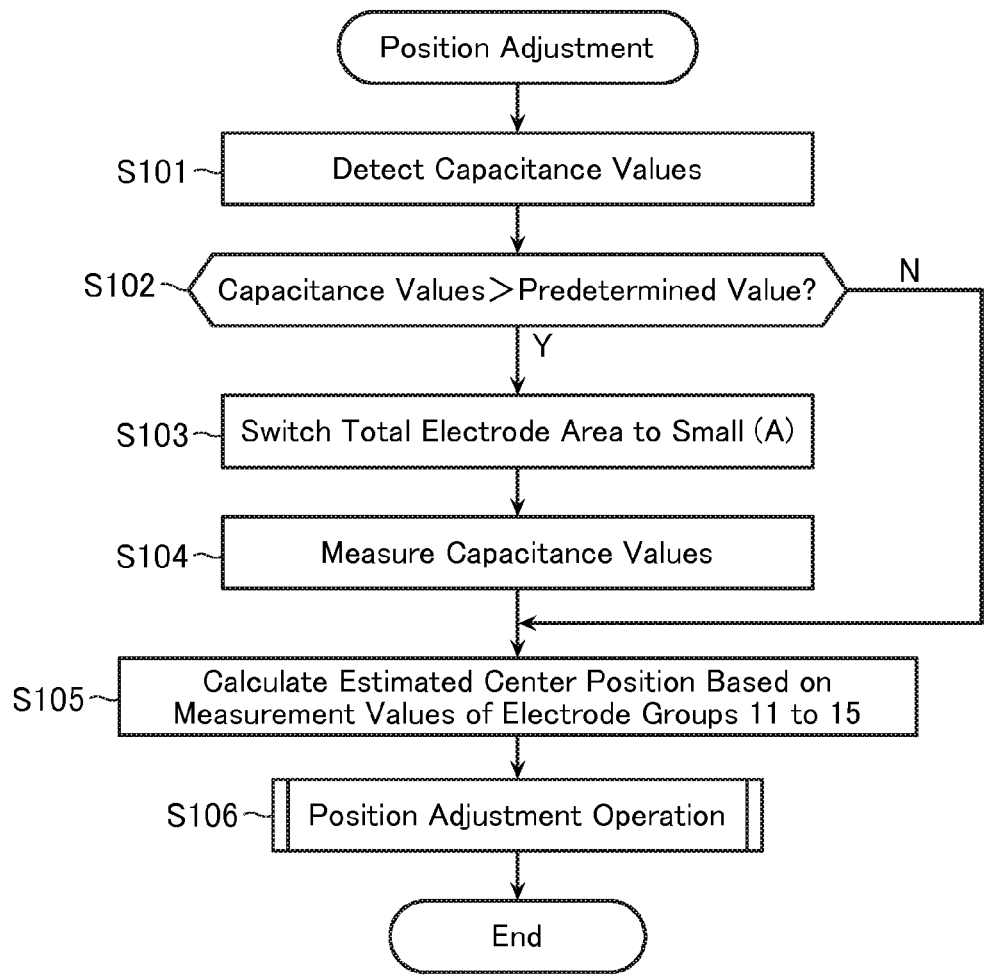
FIG. 7 is a flowchart showing an example of the procedures of a position adjustment process of the headrest position adjustment device.
Figure 8:
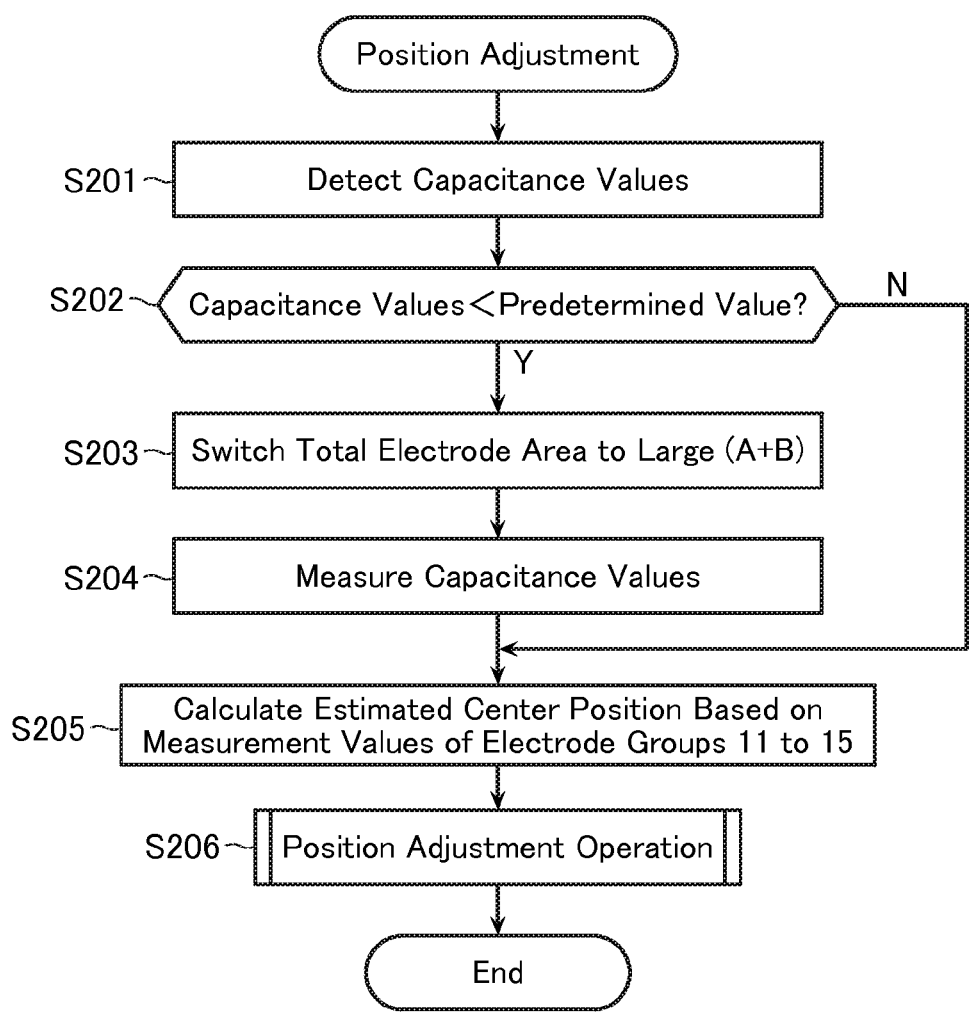
FIG. 8 is a flowchart showing another example of the procedures of a position adjustment process of the headrest position adjustment device.
Figure 9:
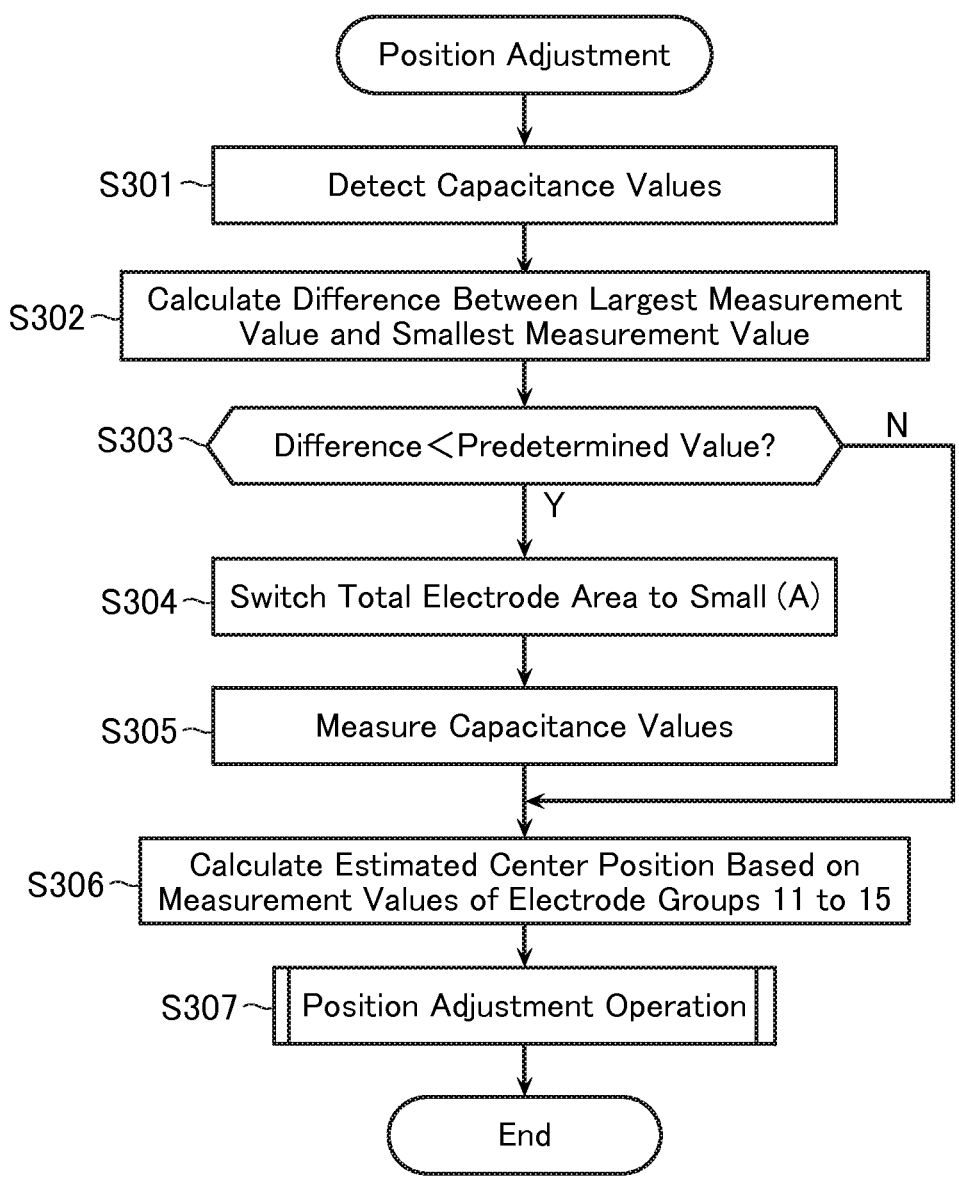
FIG. 9 is a flowchart showing yet another example of the procedures of a position adjustment process of the headrest position adjustment device.
Figure 10:
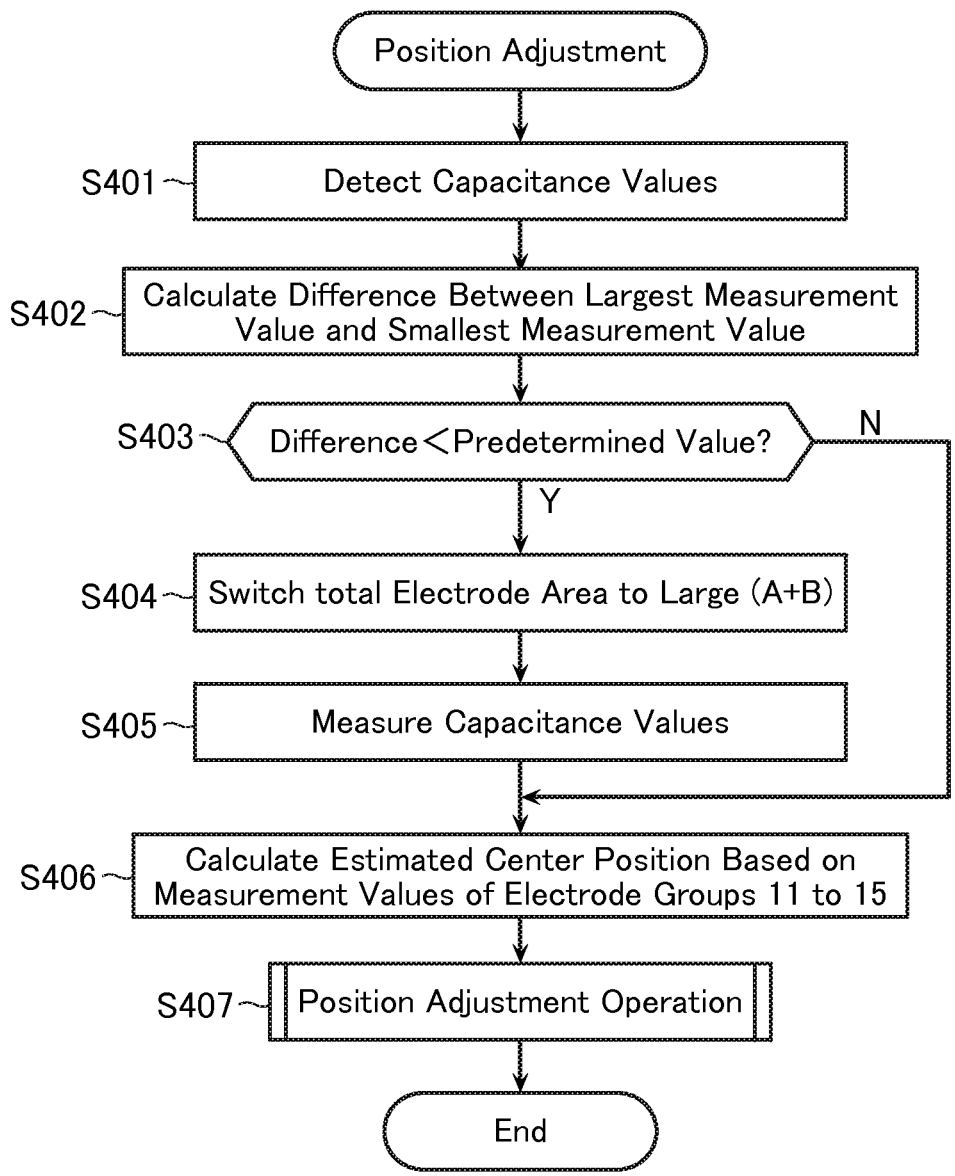
FIG. 10 is a flowchart showing still another example of the procedures of a position adjustment process of the headrest position adjustment device.
Figure 11:
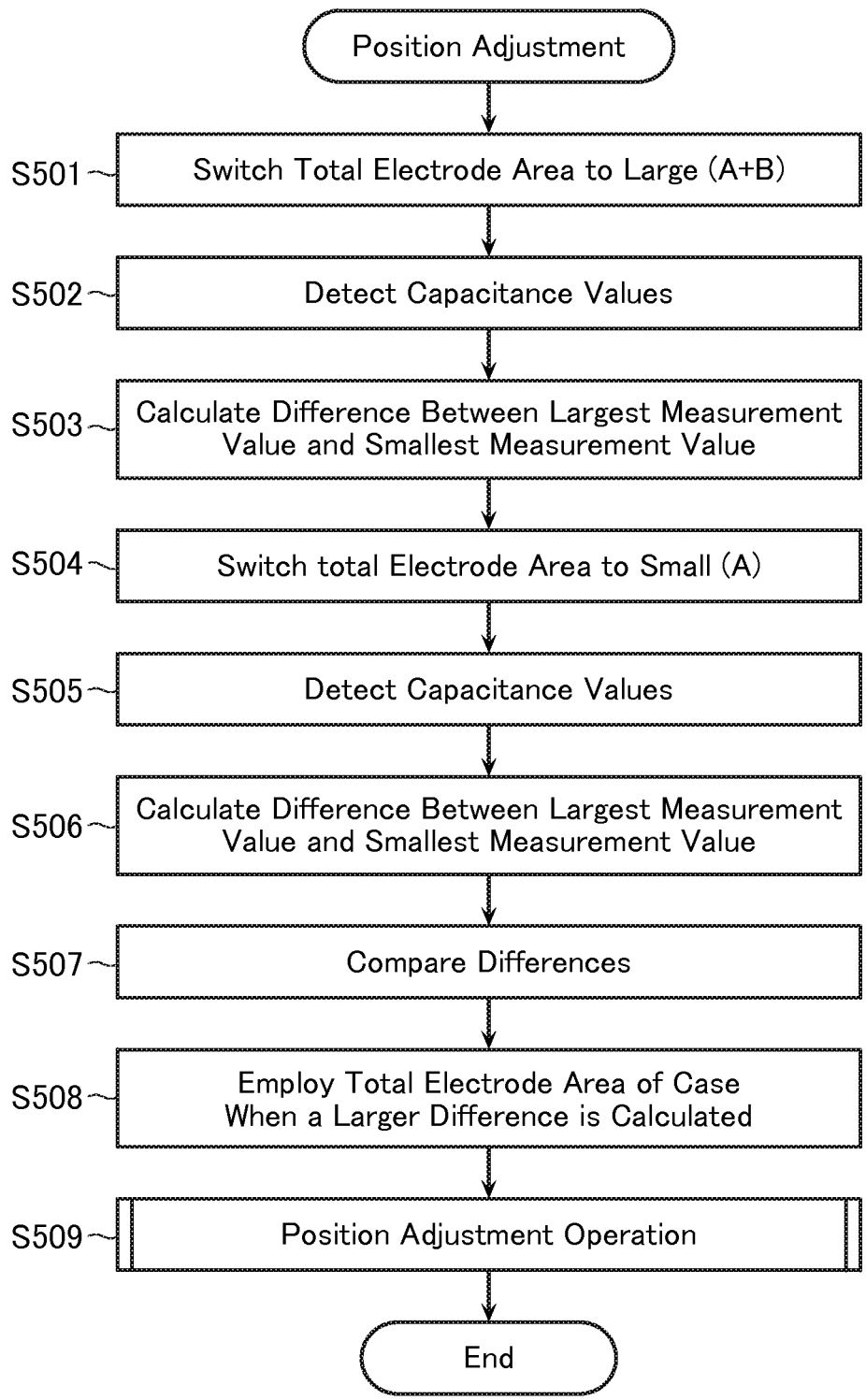
FIG. 11 is a flowchart showing still another example of the procedures of a position adjustment process of the headrest position adjustment device.

FIG. 7 is a flowchart showing an example of the procedures of a position adjustment process of the headrest position adjustment device. FIG. 8 is a flowchart showing another example of the procedures of a position adjustment process of the headrest position adjustment device. FIG. 9 to FIG. 11 are flowcharts showing other examples of the procedures of a position adjustment process of a position adjustment device. In the following description, any portions that are the same as the portions already explained will be denoted by the same reference numerals to skip explanation about them, and any portions that are not particularly relevant to the present invention might not be set forth.

As shown in FIG. 7, first, the headrest position adjustment device 100 starts the process in a state that the total electrode area of each of the electrode groups 11 to 15 is large (total electrode area A+B), and detects capacitance values based on outputs from the electrode groups 11 to 15 (step S101). Then, the headrest position adjustment device 100 judges whether or not at least one of the detected capacitance values is larger than a predetermined value (saturation voltage) (step S102).

When it is judged that at least one of the capacitance values is larger than the predetermined value (step S102; Y), the headrest position adjustment device 100 switches the total electrode area of each of the electrode groups 11 to 15 to small (total electrode area A) through the switching unit 22 (step S103), measures capacitance values (step S104), estimates the shape of the head 49 by, for example, function approximation or the like that is calculated based on the measurement values of the electrode groups 11 to 15 (total electrode area A), and calculates an estimated center position (step S105). Then, the headrest position adjustment device 100 performs a position adjustment operation of adjusting the position of the headrest 43 in the way described above by using the estimated center position and the sensor outputs (measurement values) (step S106), and completes the series of process according to the present flowchart.

When it is judged that none of the capacitance values is larger than the predetermined value (step S102; N), the headrest position adjustment device 100 goes to step S105 described above, and while keeping the total electrode area of each of the electrode groups 11 to 15 large (total electrode area A+B), estimates the shape of the head 49 by function approximation or the like that is calculated based on the measurement values of the electrode groups 11 to 15 (total electrode area A+B), calculates an estimated center position (step S105), performs a position adjustment operation (step S106), and completes the series of process according to the present flowchart.

The headrest position adjustment device 100 may also operate as shown in FIG. 8. Specifically, the headrest position adjustment device 100 first starts the process by switching the total electrode area of each of the electrode groups 11 to 15 to small (total electrode area A), and detects capacitance values based on outputs from the electrode groups 11 to 15 (step S201). Then, the headrest position adjustment device 100 judges, for example, whether or not all of the detected capacitance values fall below (are smaller than) a predetermined value (a predetermined threshold) (step S202).

When it is judged that all of the capacitance values fall below the predetermined value (step S202; Y), the headrest position adjustment device 100 switches the total electrode area of each of the electrode groups 11 to 15 to large (total electrode area A+B) through the switching unit 22 (step S203), measures capacitance values (step S204), estimates the shape of the head 49 by, for example, function approximation or the like that is calculated based on the measurement values of the sensing electrode groups 11 to 15 (total electrode area A+B), and calculates an estimated center position (step S205). Then, the headrest position adjustment device 100 performs a position adjustment operation as described above (step S206), and completes the series of process according to the present flowchart.

When it is judged that any of the capacitance values is equal to or larger than the predetermined value (step S202; N), the headrest position adjustment device 100 goes to step S205 described above, and while keeping the total electrode area of each of the electrode groups 11 to 15 small (total electrode area A), estimates the shape of the head 49 by, for example, function approximation or the like that is calculated based on the measurement values of the sensing electrode groups 11 to 15 (total electrode area A), calculates an estimated center position (step S205), performs a position adjustment operation (step S206), and completes the series of process according to the present flowchart.

Furthermore, the headrest position adjustment device 100 may operate as shown in FIG. 9. Specifically, the headrest position adjustment device 100 first starts the process in a state that the total electrode area of each of the electrode groups 11 to 15 is large (total electrode area A+B), and detects capacitance values based on outputs from the electrode groups 11 to 15 (step S301). Then, the headrest position adjustment device 100 calculates, for example, the difference between the largest measurement value and smallest measurement value among the detected capacitance values (step S302), and judges whether or not the difference is smaller than a predetermined value (step S303).

When it is judged that the difference is smaller than the predetermined value (step S303; Y), the headrest position adjustment device 100 switches the total electrode area of each of the electrode groups 11 to 15 to small (total electrode area A) through the switching unit 22 (step S304), measures capacitance values (step S305), estimates the shape of the head 49 by, for example, function approximation or the like that is calculated based on the measurement values of the sensing electrode groups 11 to 15 (total electrode area A), and calculates an estimated center position (step S306). Then, the headrest position adjustment device 100 performs a position adjustment operation as described above (step S307), and completes the series of process according to the present flowchart.

When it is judged that the difference is equal to or larger than the predetermined value (step S303; N), the headrest position adjustment device 100 goes to step S306 described above, and while keeping the total electrode area of each of the electrode groups 11 to 15 large (total electrode area A+B), estimates the shape of the head 49 by, for example, function approximation or the like that is calculated based on the measurement values of the sensing electrode groups 11 to 15 (total electrode area A+B), calculates an estimated center position (step S306), performs a position adjustment operation (step S307), and completes the series of process according to the present flowchart.

Yet further, the headrest position adjustment device 100 may operate as shown in FIG. 10. Specifically, the headrest position adjustment device 100 first starts the process in a state that the total electrode area of each of the electrode groups 11 to 15 is small (total electrode area A), and detects capacitance values based on outputs from the electrode groups 11 to 15 (step S401). Then, the headrest position adjustment device 100 calculates the difference between the largest measurement value and smallest measurement value among the detected capacitance values (step S402), and judges whether or not the difference is smaller than a predetermined value (step S403).

When it is judged that the difference is smaller than the predetermined value (step S403; Y), the headrest position adjustment device 100 switches the total electrode area of each of the electrode groups 11 to 15 to large (total electrode area A+B) through the switching unit 22 (step S404), measures capacitance values (step S405), estimates the shape of the head 49 by, for example, function approximation or the like that is calculated based on the measurement values of the electrode groups 11 to 15 (total electrode area A+B), and calculates an estimated center position (step S406). Then, the headrest position adjustment device 100 performs a position adjustment operation as described above (step S407), and completes the series of process according to the present flowchart.

When it is judged that the difference is equal to or larger than the predetermined value (step S403; N), the headrest position adjustment device 100 goes to step S406 described above, and while keeping the total electrode area of each of the electrode groups 11 to 15 small (total electrode area A), estimates the shape of the head 49 by, for example, function approximation or the like that is calculated based on the measurement values of the sensing electrode groups 11 to 15 (total electrode area A), calculates an estimated center position (step S406), performs a position adjustment operation (step S407), and completes the series of process according to the present flowchart.

Still further, the headrest position adjustment device 100 may operate as shown in FIG. 11. Specifically, the headrest position adjustment device 100 first switches the total electrode area of each of the electrode groups 11 to 15 to large (total electrode area A+B) (step S501), and detects capacitance values based on outputs from the electrode groups 11 to 15 (step S502). Then, for example, the headrest position adjustment device 100 calculates the difference between the largest measurement value and smallest measurement value among the detected capacitance values (step S503).

Next, the headrest position adjustment device 100 switches the total electrode area of each of the electrode groups 11 to 15 to small (total electrode area A) (step S504), and detects capacitance values based on outputs from the electrode groups 11 to 15 (step S505). Then, for example, the headrest position adjustment device 100 calculates the difference between the largest measurement value and smallest measurement value among the detected capacitance values (step S506).

The headrest position adjustment device 100 compares the differences obtained in these cases using different total electrode areas (step S507), employs (selects) the total electrode area of the case in which a larger one of the differences is calculated (step S508), calculates an estimated center position of the head 49 based on, for example, the obtained largest measurement value, performs a position adjustment operation as described above (step S509), and completes the series of process according to the present flowchart. The order of step S501 and step S504 described above may be interchanged. Differences may be calculated by using any other measurement value than the smallest measurement value.

The embodiment described above has been explained by using the plurality of electrode groups 11 to 15. However, even if only one electrode group is provided in the headrest 43, it is necessary to detect at least two capacitance values at positions that are different in the height direction of the headrest 43. In this case, the necessity can be satisfied by performing a capacitance scanning operation in advance at the start of the process of position adjustment, by moving the headrest 43.

As can be understood from the above, the headrest position adjustment device 100 according to the present embodiment can adjust the position of the headrest 43 accurately by calculating, for example, an estimated center position of the head 49 without fault by switching the total electrode area of each of the electrode groups 11 to 15 in accordance with how long or how short the distance d between the head 49 and the headrest 43 is to change the sensitivity.

| Description of Reference Numerals | |
|---|---|
| 10 | capacitance sensor unit |
| 11 to 15 | electrode group |
| 11A to 15A | sensing electrode |
| 11B to 15B | sensing electrode |
| 19 | substrate |
| 20 | circuit unit |
| 21 | C-V conversion circuit |
| 22 | switching unit |
| 23 | control circuit |
| 24 | shield drive circuit |
| 30 | drive motor unit |
| 31 | motor driving circuit |
| 32 | drive motor |
| 40 | seat |
| 41 | backrest (seat back) |
| 42 | sitting portion |
| 43 | headrest |
| 43a | support shaft |
| 48 | human body |
| 49 | head |
| 100 | headrest position adjustment device |

The invention claimed is:

1. A headrest position adjustment device, comprising:
an electrode group provided in a headrest mounted on a vehicle so as to correspond to a seat, the electrode group including a plurality of sensing electrodes for sensing capacitances between a head of a human body sitting on the seat and the headrest;
switching device which switches electric connection of the sensing electrodes of the electrode group to change a total active electrode area of the electrode group;
detecting device which detects capacitance values in accordance with outputs from all active electrodes of the electrode group; and
position adjusting device which adjusts a position of the headrest in a height direction based on the capacitance values from the detecting device,
wherein the switching device makes the total active electrode area of the electrode group smaller when the capacitance values detected by the detecting device are larger than a threshold.

2. The headrest position adjustment device according to claim 1,
wherein a plurality of electrode groups are arranged side by side along the height direction of the headrest.

3. A headrest position adjustment device, comprising:
an electrode group provided in a headrest mounted on a vehicle so as to correspond to a seat, the electrode group including a plurality of sensing electrodes for sensing capacitances between a head of a human body sitting on the seat and the headrest;
switching device which switches electric connection of the sensing electrodes of the electrode group to change a total active electrode area of the electrode group;
detecting device which detects capacitance values in accordance with outputs from all active electrodes of the electrode group; and
position adjusting device which adjusts a position of the headrest in a height direction based on the capacitance values from the detecting device,
wherein the detecting device detects at least two capacitance values at positions different in the height direction, and
the switching device makes the total active electrode area of the electrode group smaller when a difference between a largest capacitance value and any other capacitance value of the capacitance values detected by the detecting device is smaller than a threshold.

4. The headrest position adjustment device according to claim 3,
wherein the difference is a difference between a largest measurement value and a smallest measurement value of the capacitance values.

5. The headrest position adjustment device according to claim 4,
wherein a plurality of electrode groups are arranged side by side along the height direction of the headrest.

6. The headrest position adjustment device according to claim 3,
wherein a plurality of electrode groups are arranged side by side along the height direction of the headrest.

7. A headrest position adjustment device, comprising:
an electrode group provided in a headrest mounted on a vehicle so as to correspond to a seat, the electrode group including a plurality of sensing electrodes for sensing capacitances between a head of a human body sitting on the seat and the headrest;
switching device which switches electric connection of the sensing electrodes of the electrode group to change a total active electrode area of the electrode group;
detecting device which detects capacitance values in accordance with outputs from all active electrodes of the electrode group; and
position adjusting device which adjusts a position of the headrest in a height direction based on the capacitance values from the detecting device,
wherein the switching device makes the total active electrode area of the electrode group larger when the capacitance values detected by the detecting device are smaller than a threshold.

8. The headrest position adjustment device according to claim 7,
wherein a plurality of electrode groups are arranged side by side along the height direction of the headrest.

9. A headrest position adjustment device, comprising:
an electrode group provided in a headrest mounted on a vehicle so as to correspond to a seat, the electrode group including a plurality of sensing electrodes for sensing capacitances between a head of a human body sitting on the seat and the headrest;
switching device which switches electric connection of the sensing electrodes of the electrode group to change a total active electrode area of the electrode group;
detecting device which detects capacitance values in accordance with outputs from all active electrodes of the electrode group; and
position adjusting device which adjusts a position of the headrest in a height direction based on the capacitance values from the detecting device,
wherein the detecting device detects at least two capacitance values at positions different in the height direction, and
the switching device makes the total active electrode area of the electrode group larger when a difference between a largest capacitance value and any other capacitance value of the capacitance values detected by the detecting device is smaller than a threshold.

10. The headrest position adjustment device according to claim 9,
wherein the difference is a difference between a largest measurement value and a smallest measurement value of the capacitance values.

11. The headrest position adjustment device according to claim 10,
wherein a plurality of electrode groups are arranged side by side along the height direction of the headrest.

12. The headrest position adjustment device according to claim 9,
wherein a plurality of electrode groups are arranged side by side along the height direction of the headrest.

13. A headrest position adjustment device, comprising:
an electrode group provided in a headrest mounted on a vehicle so as to correspond to a seat, the electrode group including a plurality of sensing electrodes for sensing capacitances between a head of a human body sitting on the seat and the headrest;
switching device which switches electric connection of the sensing electrodes of the electrode group to change a total active electrode area of the electrode group;
detecting device which detects capacitance values in accordance with outputs from all active electrodes of the electrode group; and
position adjusting device which adjusts a position of the headrest in a height direction based on the capacitance values from the detecting device,
wherein the detecting device detects at least two capacitance values at positions different in the height direction, and
the switching device compares a difference, of a case when the total active electrode area of the electrode group is larger, between a largest capacitance value and any other capacitance value of the capacitance values detected by the detecting device with a difference, of a case when the total active electrode area of the electrode group is smaller, between a largest capacitance value and any other capacitance value of the capacitance values detected by the detecting device, and selects an active electrode or active electrodes so as to secure the total active electrode area of the case with a larger one of the differences.

14. The headrest position adjustment device according to claim 13,
wherein the difference is a difference between a largest measurement value and a smallest measurement value of the capacitance values.

15. The headrest position adjustment device according to claim 14,
wherein a plurality of electrode groups are arranged side by side along the height direction of the headrest.

16. The headrest position adjustment device according to claim 13,
wherein a plurality of electrode groups are arranged side by side along the height direction of the headrest.

* * * * *